United States Patent [19]

Betts

[11] 3,985,511

[45] Oct. 12, 1976

[54] CONSTANT TEMPERATURE BATH FOR LABORATORY USE

[75] Inventor: Paul J. Betts, Muskegon, Mich.

[73] Assignee: Inter Dyne, Spring Lake, Mich.

[22] Filed: Aug. 25, 1975

[21] Appl. No.: 607,227

[52] U.S. Cl. .................................. 23/292; 126/374; 219/331; 220/9 F; 220/256; 248/312

[51] Int. Cl.² ....................... A47J 27/10; B01L 7/02; F24H 1/00

[58] Field of Search ................ 23/292, 259; 21/105, 21/90, 86, 87, 99; 248/312, 315; 219/328, 331, 333; 220/9 F, 256, 287; 126/374, 376, 377

[56] References Cited

UNITED STATES PATENTS

| | | | |
|---|---|---|---|
| 2,552,641 | 5/1951 | Morrison | 220/9 F |
| 2,813,189 | 11/1957 | Lawler | 219/328 X |
| 3,745,290 | 7/1973 | Harnden, Jr. et al. | 220/9 F X |

FOREIGN PATENTS OR APPLICATIONS

| | | | |
|---|---|---|---|
| 70,018 | 9/1915 | Austria | 220/287 |

OTHER PUBLICATIONS

*Aloe Laboratory Apparatus–Equipment–Reagents*, Aloe Scientific, Catalog No. 103, St. Louis, 1952, pp. 996–998.

Scientific Apparatus, VWR Scientific, Catalog 72, New York, 1971, pp. 72, 74.

*Primary Examiner*—Joseph Scovronek
*Attorney, Agent, or Firm*—Price, Heneveld, Huizenga & Cooper

[57] ABSTRACT

The specification discloses a constant temperature bath for laboratory use including a one-piece, molded, structural expanded foam tank and an apertured cover for supporting laboratory containers. A steam heating pipe is disposed within the tank as well as an overflow stand pipe. The tank includes a peripheral lip adapting the unit for flush mounting on a laboratory counter-top. A plurality of cross sectionally Z-shaped rings are disposed within the cover apertures.

9 Claims, 5 Drawing Figures

CONSTANT TEMPERATURE BATH FOR LABORATORY USE

BACKGROUND OF THE INVENTION

This invention relates to a constant temperature bath for laboratory use. Heretofore, constant temperature baths for laboratory use have been fabricated from stainless steel. In fact, stainless steel constant temperature baths have been used for years and years in laboratories. In such an arrangement, an outer housing is formed by welding separate side and bottom sheets together and a stainless steel inner tank or liner is disposed within the housing. The space between the inner tank and the outer housing is then filled with an insulation material such as an asbestos/cement compound. A cover is provided having a plurality of apertures formed therein permitting various sized laboratory containers, such as beakers or test tubes to be suspended within the inner tank. Generally, the inner tank is filled with water and a steam pipe is connected through the inner tank and outer housing in order to maintain the water at a constant temperature.

Stainless steel has been felt to be necessary for laboratory use due to its excellent rust resistance, corrosion resistance, acid resistance, as well as for its ability to provide a fairly rigid structural unit. However, the stainless steel elements must be fabricated separately and welded together to form the assembly. This fabrication and assembling technique is time consuming due to the separate steps involved and due to the difficulty of welding stainless steel. Also, an insulation material must be inserted between the inner and outer walls of the bath assembly. If an asbestos/cement compound is employed, it may be difficult to insure that the space between the inner tank and outer housing is completely and uniformly filled with the insulating material.

It can therefore be seen that while the prior art constant temperature laboratory baths have been acceptable for use under laboratory conditions, inherent difficulties arising from the manufacturing process present numerous quality control problems, as well as relatively high initial costs.

SUMMARY OF THE INVENTION

In accordance with the present invention, an improved constant temperature bath for laboratory use is provided, possessing the qualities of structural rigidity, freedom from rust and corrosion, light weight, relatively low initial cost, and ease of manufacture. Essentially, the bath includes a one-piece tank molded from a structural expanded foam, such as polyurethane, polystyrene, or polypropylene. During the molding operation or afterwards, various apertures are provided for a water supply inlet and an overflow stand pipe.

A cover formed from a structural expanded foam is preferably provided, having a plurality of apertures within which are disposed ceramic adapter rings permitting various sized laboratory containers to be supported within the constant temperature bath. The one-piece molded structural expanded foam tank includes a peripheral lip or flange permitting the entire unit to be suspended within an opening formed in a laboratory countertop.

A top having a depending peripheral skirt is also included. The top is formed from a structural expanded foam and is shaped to rest on the peripheral edge of the support cover. The top provides usuable space along the laboratory countertop when the bath is not in use, serves to retain heat within the bath and prevent the accidental burning of laboratory technicians.

The present invention, therefore, substantially eliminates the inherent problems relating to difficulty of manufacture, quality control, weight, and relatively high initial costs heretofore experienced with constant temperature laboratory baths.

DESCRIPTION OF THE PRIOR ART

Figure 5:
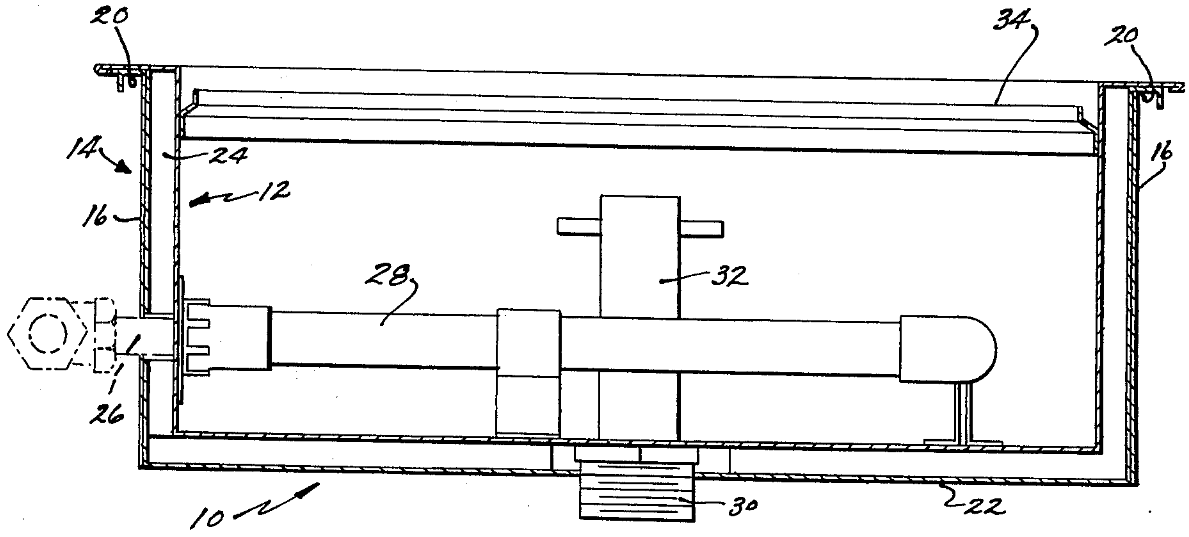
FIG. 5. PRIOR ART
FIG. 5 is a side elevation in cross section of a prior art stainless steel constant temperature bath.

A conventional, stainless steel constant temperature laboratory bath generally designated 10 is shown in FIG. 5. The bath includes an inner tank 12, stamped from a sheet of stainless steel, and an outer housing or tank 14. As can be seen, the outer housing is formed from separate sides 16 joined together at the top by a frame channel 20 and welded to a bottom member or tray 22. There is a space 24 between the outer housing 14 and the inner tank 12 which must be filled with an asbestos/cement compound or other suitable insulation. A coupling element 26 interconnects the steam pipe 28 with the steam supply through the space 24. A hex brass bushing 30, positioned in a water-tight manner in the bottom of the inner tank 12 and bottom tray 22, serves to support an overflow stand pipe 32. Further, a support channel 34 must be weldably attached to the upper, inner peripheral surface of the inner tank 12 in order to retain in position a suitable steam bath cover (not shown).

It is therefore readily apparent that the conventional, prior art constant temperature bath is constructed from a multitude of stainless steel parts which are weldably interconnected. This fabrication process is relatively costly and time consuming. Further, good quality control must be employed to prevent leakage around the coupling 26 and brass bushing 30, as well as to insure an even distribution of the insulation material within the space 24. These problems are substantially alleviated by the present invention.

DETAILED DESCRIPTION OF THE PREFERRED EMBODIMENT

Figure 1:
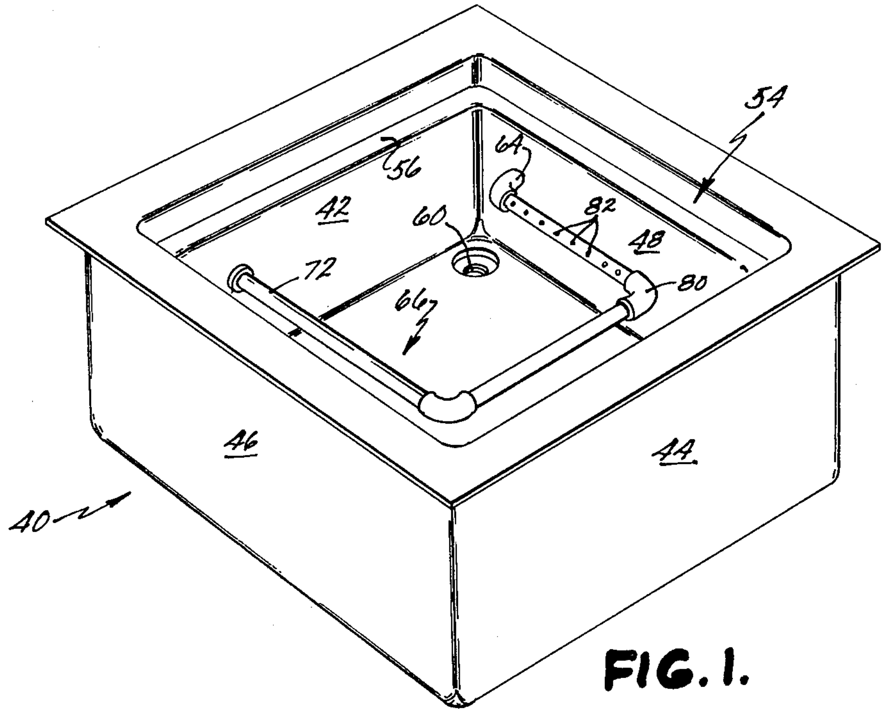
FIG. 1 is a perspective view of a constant temperature laboratory bath in accordance with the present invention.
Figure 2:
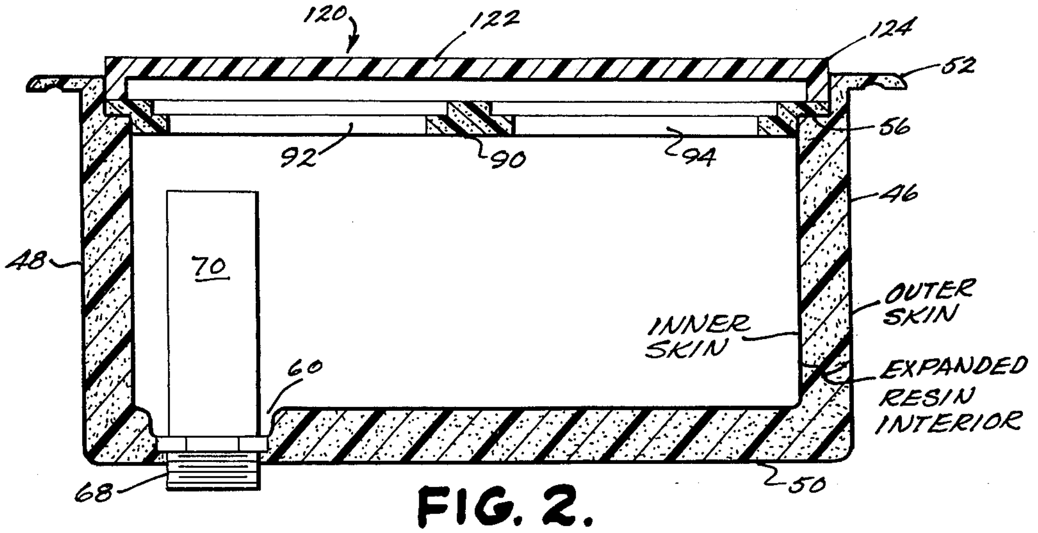
FIG. 2 is a side elevation in cross section of a rigid, structural expanded foam tank in accordance with the present invention.

The preferred embodiment of a constant temperature bath for laboratory use in accordance with the present invention is illustrated in FIGS. 1–4 of the drawings. As best seen in FIGS. 1 and 2, the bath, generally designated 40, includes a one-piece rigid, structural expanded foam tank having sides 42, 44, 46, 48 and a bottom 50. The tank if formed with an integrally molded peripheral flange or lip 52 around the upper edge of the side walls. A groove 54 is provided around the inner peripheral surface of the side walls of the tank, thereby providing a support ledge or surface 56. The flange 52 adapts the overall unit for flush mounting on a countertop surface.

During the molding or casting operation by which the unit 40 is formed, an aperture 60 may be produced in the bottom 50 of the tank as well as aperture 64 in side wall 48 through which the steam pipe assembly 66 passes into tank 40. An externally threaded bushing 68 is disposed within the aperture 60. An overflow stand pipe 70 having external threads formed on its lower end is then threadably connected to the internally threaded portion of the bushing 68.

The steam pipe assembly 66 which enters the tank at aperture 64 includes straight pipe sections 72, 74, and 76 interconnected by suitable ninety degree elbows 78 and 80. All three pipe sections are provided with a plurality of apertures 82. These apertures permit steam entering the pipe assembly to bubble through the water maintained within the tank, thereby heating the water.

A conventional temperature responsive control system (not shown) may be employed in conjunction with the bath assembly to control an inlet valve to the steam pipe to maintain the bath at a constant temperature. Make-up water to replace that which has evaporated is sufficiently supplied by steam through the steam pipe assembly 66, some of which steam condenses as it enters the water in the bath. Thus, pipe 66 is also the make-up water supply pipe. If too much water enters tank 40, it flows over the top of stand pipe 70.

Figure 4:
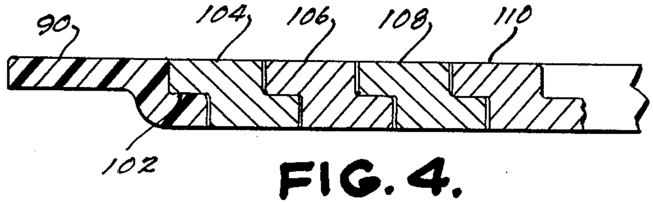
FIG. 4 is a cross section taken along the line IV—IV of FIG. 3.
Figure 3:
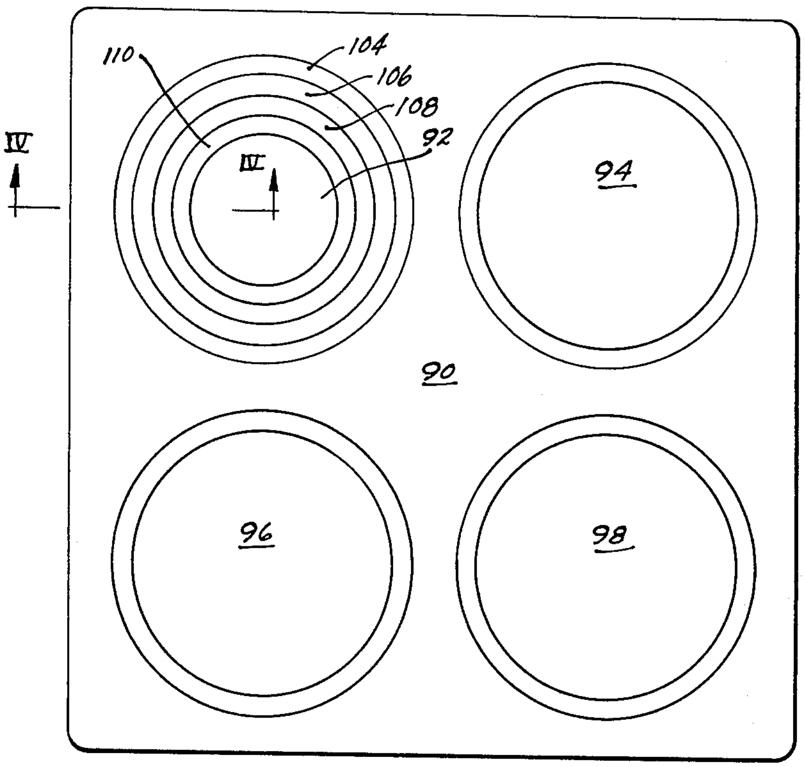
FIG. 3 is a plan view of the constant temperature bath cover.

Referring to FIGS. 2, 3 and 4, a structural expanded foam steam bath cover 90 is shown as including a plurality of openings 92, 94, 96 and 98. The cover is shaped so as to fit within the groove 54 of the tank and be supported by the ledge 56. Each opening includes a ledge 102 formed around its inner periphery. Concentric rings 104, 106, 108 and 110 formed from a ceramic material are shown disposed within opening 92. As seen in FIG. 4, each of the ceramic rings has a generally Z-shaped cross section and each varies in internal diameter. The outermost ring 104 is supported by the ledge 102 of the steam bath cover 90. In a like manner, each smaller concentric ring is supported by the next largest ring. These rings or adapters permit the suspension of various sized laboratory containers through the openings formed in the steam bath cover into the constant temperature bath maintained within the tank 40. Each ring provides a ledge surface upwardly disposed upon which the upper flange of the container (not shown) may rest. The cover 90 is also a molded or cast article formed from a structural expanded foam.

A removable top 120 having a planar surface 122 and a depending skirt 124 is adapted to fit within the groove 54 of the tank. The skirt 124, as shown in FIG. 2, rests on the upper, peripheral edge of the support cover 90. The top 120 is likewise a molded or cast article formed from a structural expanded foam.

The top 120 serves to retain heat within the tank 40, thereby reducing the amount of energy expended to maintain the bath at a constant temperature. Further, during use of the bath, the cover 90, ceramic support rings 104, 106, 108 and 110 and the suspended laboratory containers become very hot and are a source of burns to technicians. Since the top 120 covers these portions of the bath, accidental burning is substantially alleviated. Also, when the bath is not in use, the planar surface 122 of the top 120 provides additional laboratory countertop work space.

The structural expanded foam from which the tank, top and cover of the subject constant temperature bath are formed may be either polyurethane, polystyrene, or polypropylene. It is preferred, however, that a rigid, self-skinning urethane foam having a density of approximately 12 pounds per cubic foot be employed for forming the structural members since polyurethane possesses better acid resistance than either polystyrene or polypropylene. Such a composition results in a tank having sufficient strength and rigidity to be supported on a countertop by the flange 52. The use of a self-skinning urethane foam results in a smooth interior and exterior skin for the bath. This feature permits easier cleaning of the entire bath assembly. The skin comprises closely packed reacted resin at the surface of the item and is illustrated in FIG. 2 by the heavy, dark outline of the cross section. Between the inner and outer skins, the reacted resin is expanded and less dense than it is at the immediate surface. The expanded interior serves both a structural and an insulating function. The prior bath of FIG. 5 includes the support channel 34, providing a place for dirt, mineral deposits and other contaminates to collect. Due to the shape of the support channel, removal of these contaminates may be difficult. However, with a constant temperature bath in accordance with the subject invention, hard to reach and clean crevices are not present.

It should be noted that the main components of the present constant temperature bath may be employed in conjunction with a hot water supply or with an electrical heating element as opposed to the steam supply system illustrated in the drawings. In such case, the single aperture in the side wall 48 of the main tank accepts a hot water supply pipe in the case of a hot water bath or a make-up water supply pipe in case an electrical heating element were employed. With each arrangement, provision must be made to supply make-up water to the tank to replace that lost through evaporation. A typical system would employ a float operated valve (not shown) to maintain the water height within the tank at a constant level.

In use, the tank 40 would be filled with water to the level of the overflow stand pipe. Various sized laboratory containers would then be disposed within the rings and/or within the openings formed in the steam bath cover. The float operated make-up water control system and the temperature sensitive control system would then function to maintain a constant level of water at a constant temperature within the tank 40.

It will thus be appreciated that the present invention provides a constant temperature bath for laboratory use having relative light weight, ease of manufacture, ease of maintenance, as well as relative low cost when compared with a stainless steel constant temperature water bath. It is expressly intended, therefore, that the foregoing description is illustrative of the preferred embodiment only and is not to be considered limiting. The true spirit and scope of the present invention will be determined by reference to the appended claims.

The embodiments of the invention in which an exclusive property or privilege is claimed are defined as follows:

1. A constant temperature bath for laboratory use containing a liquid and being capable of maintaining a laboratory container at a relatively constant temperature and possessing qualities of structural rigidity, relative low cost, and ease of manufacture, comprising:

a rigid, self-skinning resin foam, one-piece integrally molded tank, said tank having an open upper end, sides, and a bottom; and an inner and outer skin of closely packed reacted resin and an expanded reacted resin between said inner and outer skin;

liquid supply means connected to said tank for supplying a liquid;

overflow means disposed within said tank for allowing excess fluid to drain out of said tank without flowing over the top edge of the tank; and heating means disposed in said tank for heating a liquid and maintaining said liquid at a constant temperature.

2. A constant temperature bath as defined by claim 1 wherein said overflow means comprises an aperture in said bottom of said tank and an overflow stand pipe disposed within said bottom aperture.

3. A constant temperature bath as defined by claim 1, wherein said one-piece tank is a rigid, self-skinning urethane foam tank.

4. A constant temperature bath as defined by claim 2, wherein said one-piece tank further includes a peripheral flange extending around the upper edge of said tank thereby adapting said bath for flush mounting on a laboratory countertop.

5. A constant temperature bath as defined by claim 1 wherein one of the sides of said one-piece tank has an aperture formed therein, and wherein said liquid supply means connected to said tank and said heating means comprises:

a steam pipe assembly entering said tank through said side aperture, said steam pipe assembly including at least one pipe having a plurality of apertures formed therein permitting the steam to bubble through the liquid maintained within the bath to thereby heat the liquid and replenish it.

6. A constant temperature bath as defined by claim 1 and including a structural expanded foam cover having at least one opening formed therein through which a laboratory container may be suspended into the liquid within the tank.

7. A constant temperature bath as defined by claim 6, further including:

a plurality of generally cross sectionally Z-shaped rings of different diameters concentrically supported within said opening of said cover, each ring of a smaller diameter being supported by each ring of the next largest diameter.

8. A constant temperature bath for laboratory use as defined by claim 6 further including a removable structural expanded foam top adapted to rest on the upper peripheral edge of said cover.

9. A constant temperature bath for laboratory use as defined by claim 8 wherein said top includes a depending, peripheral skirt adapted to rest on said cover.

* * * * *